Oct. 25, 1960 C. L. GREEN 2,957,976
WELDING DEVICE
Filed Oct. 10, 1958 2 Sheets-Sheet 1

Clifton L. Green,
INVENTOR.

BY

ATTORNEYS.

Oct. 25, 1960 — C. L. GREEN — 2,957,976
WELDING DEVICE
Filed Oct. 10, 1958 — 2 Sheets-Sheet 2

Clifton L. Green, INVENTOR.

United States Patent Office 2,957,976
Patented Oct. 25, 1960

2,957,976

WELDING DEVICE

Clifton L. Green, 608 Hereford Drive, Athens, Ala.

Filed Oct. 10, 1958, Ser. No. 766,628

4 Claims. (Cl. 219—81)

(Granted under Title 35, U.S. Code (1952), sec. 266)

The invention described herein may be manufactured and used by or for the Government for governmental purposes without the payment of any royalty thereon.

My invention relates to a machine for spot welding pairs of lapped plates and more particularly to contact wheels for such a machine.

Spot welded lapped joints are limited to ¼ inch total thickness, and the spaced welds are required to meet specifications stipulating that welds between those of such plates having equal thicknesses shall include nuggets projecting 50% into each of the plates, and that welds between such plates of unequal thickness shall include nuggets projecting into the thinner plate 20% of the thickness thereof, and into the thicker plate 80% of the thickness thereof. The depressions in the plates accompanying the welds are required by the specifications to be substantially circular and to penetrate the plates less than .003 inch.

The specifications further require that the plates be free from stains corresponding to the weld nuggets. The electrodes of the welding machine are respectively provided with journaled wheels for contact with the respective plates and it has been determined that such stains are caused by pickup by the wheels of the material of certain plates and redeposit of the material in oxidized form on the surfaces of the plates at the welds.

In commercial welding, such stains are disregarded. To overcome the strains for material required to meet the specifications noted above, metallic plates are designated in Classes I, II, and III with respective weldability characteristics comparable to those of the materials, aluminum, carbon steel and stainless steel and wheels of different copper compositions are customarily employed for welding plates of the respective classes.

Recommendations of the American Welding Society include complicated specifications for pairs of electrode wheels within the classes to meet the various combinations of composition, thicknesses and hardness in the plates. Although commercial machines are provided with facilities for many intricate combinations of pressure and current cycles, complete equipment of such a machine for welding all of the combinations of plates within the ¼ inch range of total thickness would include some 200 pairs of wheels or substantially a pair of wheels for each of the combinations. An average machine is provided with approximately 54 pairs of wheels, entailing considerable storage facilities for each machine. The wheels are currently priced at substantially $700 per pair, and the requirement of frequent changes in machine setups entails high operating costs of the machines.

It is an object of my invention to provide a pair of contact wheels for a welding machine to perform the entire spot welding functions of the machine.

Another object of my invention is to provide such a machine with such pairs of the wheels provided with compositions corresponding to the classes of plate material.

Other aims and objects of my invention will appear from the following description.

In carrying out my invention, tests of spot welds revealed that the character of the welds in the range below ¼ inch total thickness is substantially independent of the diameters of the contact wheels. Plates in the thickness range were spot-welded with pairs of wheels having unequal edge radii of 2 inches to 20 inches. Of all of the combinations tested, the only combination that succeeded in lap-welding all the combinations of thicknesses of plates within the range, in conformance with the specifications, included wheels with edge radii of 4 inches and 8 inches. In welding pairs of plates of unequal thickness the 4″ wheel was disposed for contact with the thinner plate.

To eliminate staining of the welded plates, similar pairs of the wheels were constructed of the usual compositions corresponding to the classes of material.

For more complete understanding, reference is directed to the following description and the accompanying drawing, in which, Fig. 1 is a view of the electrodes of a welding machine incorporating an embodiment of my invention;

Figure 1:
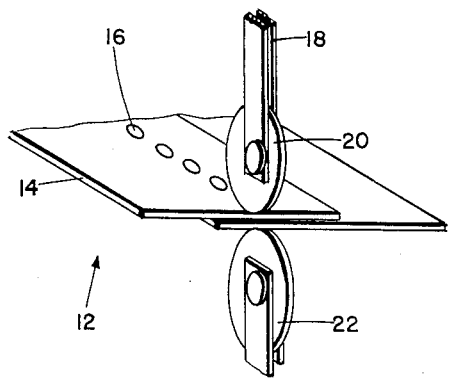

Accordingly, a machine 12, for securing lapped portions of plates 14 together with spaced welds 16 is provided with electrodes 18, and a pair of wheels 20 and 22 disposed for selective journaled engagement with the electrodes.

Figure 3:
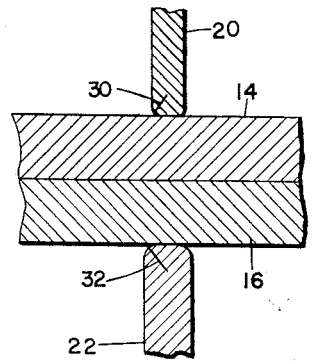
Fig. 3 is a view along line 3—3 of Fig. 2.
Figure 2:
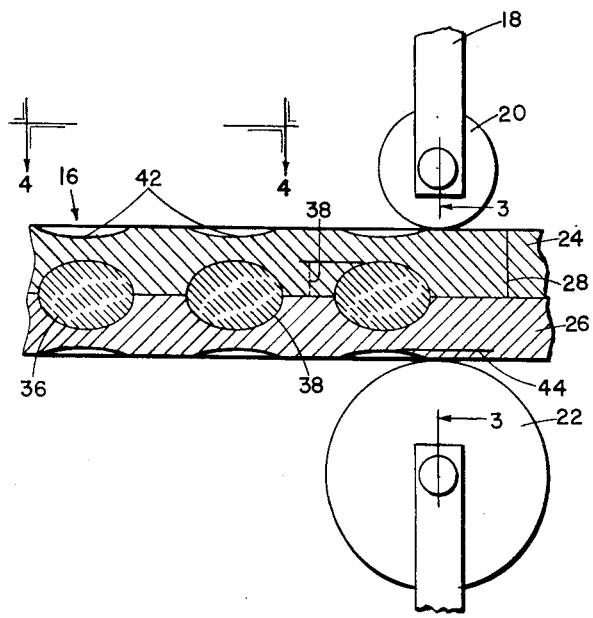
Fig. 2 is an enlarged sectional view through the welds.
Figure 4:
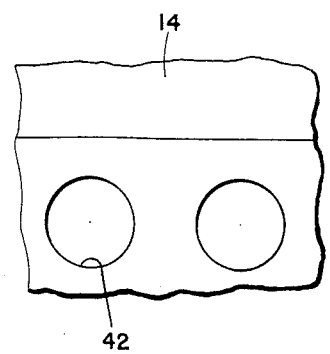
Fig. 4 is a view along line 4—4 of Fig. 2.

As shown in Fig. 3, plates 24 and 26 are of equal thickness 28 and wheels 20 and 22 are rounded and provided with edge radii 30 and 32 for respective engagement with the plates. In plates of equal thickness, machine 12 is required to produce nuggets 36 of welds having portions 38 respectively projecting into 50% of thickness 28. The nuggets are respectively accompanied by depressions 42 disposed in the surfaces of the plates and the depressions are required by the specifications to be substantially circular as shown in Fig. 4. The greatest allowable depth 44 of the depressions is .003 inch.

Wheels 20 and 22 having edge radii 30 and 32 of 4 and 8 inches respectively were found to produce nuggets 36 and depressions 42 within the specification for all of the equal plate thicknesses within the range.

Figure 5:
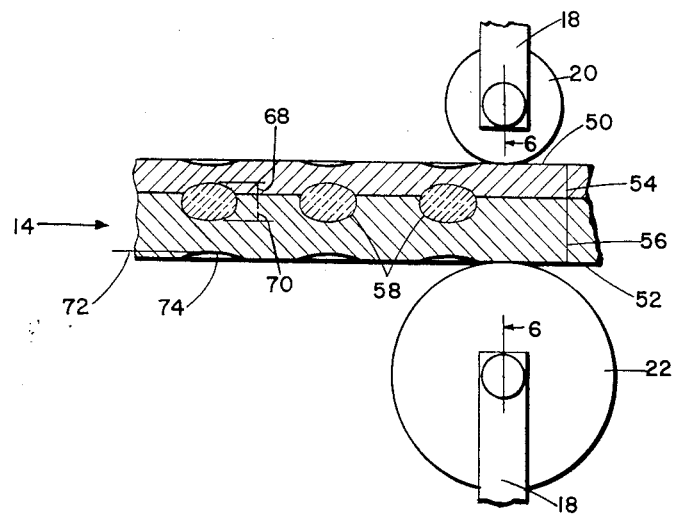
Fig. 5 is a view of the electrodes including a pair of wheels for welding plates of non-uniform thickness; and, Fig. 6 is a view along line 6—6 of Fig. 5.
Figure 6:
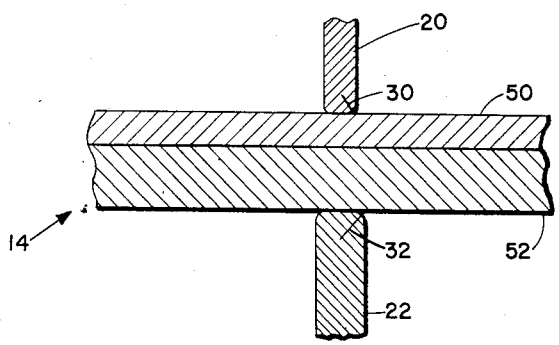

Wheels 20 and 22 as shown in Fig. 5 are disposed for joining a pair of plates 50 and 52 having unequal thicknesses 54 and 56 respectively to produce spaced weld nuggets 58 with portions 68 and 70 of substantially 20% and 80% respective penetration into the thicknesses of the respective plates. The depth 72 of depressions 74 corresponding to welds 58 was found to be within the maximum depth of .003 inch allowable in the specification.

Intervals between welds 16 may be reduced for overlapping thereof to produce a pressure proof continuous weld between plates 14 with similar penetration of the welds in the equal and unequal depth plates.

Similar wheels were constructed of the compositions customarily employed for welding plates in the material classes noted above to produce welds within the specification for staining.

While the foregoing is a description of the preferred embodiment, the following claims are intended to include those modifications and variations that are within the spirit and scope of my invention.

I claim:

1. In a machine disposed to produce spaced weld nuggets between lapped portions of metallic plates and provided with a pair of electrodes; a pair of wheels disposed for respective journaled engagement with the electrodes and provided with rounded edges having complementary unequal radii of curvature for respective engagement with the lapped portions to produce therein substantially circular depressions and accompanying nuggets with penetrations thereof in the respective plates corresponding to the thicknesses thereof.

2. A pair of wheels as in claim 1 with said complementary radii having respective values of substantially 4 inches and 8 inches to limit the maximum depth to the depressions of .003 inch; for penetrations of the nuggets into plates of equal thickness, 50% thereof; and for respective penetrations of the nuggets into plates of small and large thickness, 20% and 80% thereof.

3. The process of producing spaced spot welds between lapped portions of pairs of metallic plates comprising respectively journaling in the electrodes of a welding machine a pair of wheels having edges rounded and provided with unequal complementary edge radii and passing the lapped portions through the machine in respective engagement with said wheels for operation of the machine to produce spaced circular depressions in the respective plates, and corresponding nuggets therebetween having penetrations in the plates corresponding to the thicknesses thereof.

4. A process as in claim 3 with the wheels of said pair respectively provided with 4 inch and 8 inch edge radii for respective engagement with plates of the pairs thereof having equal thickness for 50% penetration of the nuggets therein; respective engagement with the thinner and other plates of the pairs having unequal thicknesses for 20% and 80% respective penetration therein; and for corresponding circular depressions in all of the plates limited to a depth of .003 inch.

References Cited in the file of this patent

UNITED STATES PATENTS

| | | |
|---|---|---|
| 1,264,058 | Geisenhower | Apr. 23, 1918 |
| 1,522,993 | Alexander | Jan. 13, 1925 |
| 1,583,906 | Von Henke | May 11, 1926 |
| 1,862,108 | Brueckner | June 17, 1932 |
| 2,684,424 | Anderson | July 20, 1954 |